United States Patent [19]

Hodgins et al.

[11] Patent Number: 5,000,848
[45] Date of Patent: Mar. 19, 1991

[54] ROTARY FILTRATION DEVICE WITH HYPERPHILIC MEMBRANE

[75] Inventors: Leonard T. Hodgins, Closter, N.J.; Edgar Samuelsen, Brooklyn, N.Y.

[73] Assignee: Membrex, Inc., Fairfield, N.J.

[21] Appl. No.: 405,084

[22] Filed: Sep. 6, 1989

Related U.S. Application Data

[63] Continuation of Ser. No. 225,000, Jul. 27, 1988, abandoned, which is a continuation-in-part of Ser. No. 149,552, Jan. 28, 1988, Pat. No. 4,806,379, which is a continuation-in-part of Ser. No. 7,623, Jan. 28, 1987, abandoned.

[51] Int. Cl.$^5$ .............................................. B01D 65/08
[52] U.S. Cl. .......................... 210/321.68; 210/500.24; 210/500.38; 210/500.43
[58] Field of Search .............. 210/638, 644, 651, 654, 210/321.62, 321.68, 500.24, 500.43, 502.1, 198.2; 427/244, 245, 246

[56] References Cited

U.S. PATENT DOCUMENTS

| | | | |
|---|---|---|---|
| 2,534,204 | 12/1950 | Mowry | 260/404.5 |
| 3,355,382 | 11/1967 | Huntington | 210/22 |
| 3,396,103 | 8/1968 | Huntington | 210/23 |
| 3,797,662 | 3/1974 | Titus | 210/78 |
| 3,821,108 | 6/1974 | Manjikian | 210/23 |
| 3,830,372 | 8/1974 | Manjikian | 210/321 |
| 3,849,305 | 11/1974 | Manjikian | 210/116 |
| 3,948,823 | 4/1976 | Lee et al. | 210/500 M X |
| 4,066,554 | 1/1978 | Guyer | 210/342 |
| 4,093,552 | 6/1978 | Guyer | 210/297 |
| 4,147,745 | 4/1979 | Sano et al. | 264/22 |
| 4,178,438 | 12/1979 | Haase et al. | 210/502.1 X |
| 4,265,959 | 5/1981 | Sano et al. | 428/216 |
| 4,415,631 | 11/1983 | Schutijser | 428/405 |
| 4,427,552 | 1/1984 | Lieberherr et al. | 210/741 |
| 4,477,634 | 10/1984 | Linder et al. | 210/500.2 X |
| 4,501,785 | 2/1985 | Nakanishi | 210/500.2 X |
| 4,584,103 | 4/1986 | Linder et al. | 210/650 |
| 4,614,714 | 9/1986 | Kusakabe et al. | 435/191 |
| 4,713,176 | 12/1987 | Schoendorfer et al. | 210/321.68 X |
| 4,714,556 | 12/1987 | Ambrus et al. | 210/638 |
| 4,790,942 | 12/1988 | Schmidt et al. | 210/650 |

FOREIGN PATENT DOCUMENTS

| | | |
|---|---|---|
| WO8502783 | 7/1985 | PCT Int'l Appl. |
| 677516 | 8/1952 | United Kingdom |
| 1603746 | 11/1981 | United Kingdom |
| 1603747 | 11/1981 | United Kingdom |

OTHER PUBLICATIONS

Sulzer Biotechnics, "Dynamic Pressure Filtration", Bulletin 23-43-00-40-V85-10, two-page brochure (1985).

Dean and Nerem (editors), *Bioprocess Engineering Colloquium*, pp. 93-96, (American Society of Mechanical Engineers), Hildebrandt and Saxton, "The Use of Taylor Vortices in Protein Processing to Enhance Membrane Filtration Performance", (1987).

Magat, "Acid-Catalyzed Reactions of Nitriles", Parts I, II, III, and IV, *Journal of the American Chemical Society*, vol. 73, pp. 1028-1037 and 1367-1368 (1951).

Hodgens and Levy, "Affinity Adsorbent Preparation", *Journal of Chromatography*, vol. 202, pp. 381-390 (1980).

*Primary Examiner*—Frank Spear
*Attorney, Agent, or Firm*—Bryan, Cave, McPheeters & McRoberts

[57] ABSTRACT

A rotary filtration device having at least two members, one at least partially within the other to define a fluid gap therebetween, is disclosed. One or more filters are located on one or more of the members facing the fluid gap. Sufficient uncharged hydrophilic polar groups, preferably uncharged substituted amide groups, are located on the surface of the filter to render the surface hydrophilic.

29 Claims, 4 Drawing Sheets

ROTARY FILTRATION DEVICE WITH HYPERPHILIC MEMBRANE

RELATED APPLICATIONS

This application is a continuation of U.S. Pat. Application Ser. No. 07/225,000, filed July 27, 1988, now abandoned, which is a continuation-in-part of U.S. Application Ser. No. 149,552, filed Jan. 28, 1988, now U.S. Pat. No. 4,906,379, which in turn is a continuation-in-part of Ser. No. 007,623, now abandoned, filed Jan. 28, 1987, all of which applications are hereby incorporated into this application in their entirety.

BACKGROUND OF THE INVENTION

Filtration devices are used to separate one or more components of a fluid from the other components. Processes that may be carried out in such devices include filtration, reverse osmosis, ultrafiltration, and pervaporation. These separation processes make use of the greater permeability of some fluid components than others through the filter. The fluid components that pass through the filter comprise the permeate and those that do not pass through (i.e., are rejected) comprise the retentate. Depending on the process, the valuable fraction may be the permeate or the retentate or in some cases both may be valuable.

A common problem in all filtration devices is blinding or clogging of the filter. The permeate passes through the filter from the fluid layer adjacent the feed side of the filter, leaving a retentate layer adjacent that side of the filter having a different composition than the bulk feed fluid composition or the permeate composition. This material may bind to the filter, e.g., clog its pores (if it is a porous filter), or remain as a stagnant layer near the filter (e.g., a gel layer) and in either case reduce mass transport through the filter. Use of rotation (e.g., having the filter mounted on a rotating member) has been one attempt to break up and remove this stagnant layer and reduce clogging of the filter.

Regarding rotary filtration devices, see the commonly owned applications of Membrex, Inc.: PCT Published Application WO 85/02783, published July 4, 1985; U.S. Pat. Application No. 61,007, filed Apr. 10, 1987, now U.S. Pat. No. 4,790,942, and the art cited therein; Ser. No. 134,200, filed Dec. 16, 1987 now U.S. Pat. No. 4,911,847; Ser. No. 160,693, filed Feb. 26, 1988 now U.S. Pat. No. 4,876,013; and Ser. No. 204,621, filed June 9,1988 now u.S. Pat. No. 4,867,878; all of which applications and art are hereby incorporated by reference in their entirety. Also see patents of Sulzer-Escher Wyss Ltd.: U.S. Pat. Nos. 3,797,662, 4,066,554, 4,093,552, and 4,427,552.

Rotary filtration devices have a rotating member (e.g., a cylinder) and a second member that may be stationary or rotate in the same or a different direction as the first member. A rotating member may alternate direction of rotation, e.g., clockwise, then counterclockwise, then clockwise, and so on. Fluid to be filtered is placed in the gap between the two members and permeate flows through the one or two filters facing the gap. Filters (e.g., membranes) may be mounted on one or both members. For example, with a device having an inner cylindrical member and an outer cylindrical member that together define a narrow cylindrical gap between them, the filter may be mounted only on the outside of the inner member, or only on the inside of the outer member, or a filter may be mounted on each, and either or both members may rotate in the same or different directions.

The gap between the inner and outer members may be of any size and shape. However, it has been found desirable in some rotary filtration devices to use a gap width sufficiently small and to operate the device in such a manner (e.g., high enough rotational speed) to establish Taylor vortices in the fluid in the gap. These vortices generally help improve mass transfer through the one or more filters by reducing the relatively stagnant layer that tends to exist near a filter surface.

Various schemes have been used for cleaning the filters in filtration devices and for trying to prevent blinding of the filters. Sulzer-Escher Wyss literature (see, e.g., Sulzer Biotechnics "Dynamic Pressure Filtration," Bulletin 23-43-00-40-V85-10, two-page brochure (1985)) and the membrex applications noted above show the use of Taylor vortices in rotary devices. In Huntington U.S. Pat. No. 3,355,382 the reverse osmosis desalination membranes are periodically cleaned by suddenly raising the product pressure above the feed pressure to create a water hammer. In Huntington U.S. Pat. No. 3,396,103 the shape of the filtering surface results in fluid flow paths that tend to break up the stagnant (boundary) layer. In Manjikian U.S. Pat. Nos. 3,821,108, 3,830,372, and 3,849,305 stirrers are used to keep the feed fluid mixed to prevent blinding. In U.K. Pat. Nos. 1,603,746 and 1,603,747 two rotors operating at different speeds and centripetal force are used to reduce filter blinding. A filter that was strong and durable enough to withstand use in a rotary filtration device yet inherently had a reduced tendency to clog or become blinded would be most advantageous.

A variety of materials have been used for filters. Such materials must have sufficient chemical resistance, physical strength, etc. to be useful. For example, filters for reverse osmosis, ultrafiltration, microfiltration, pervaporation, and dialysis often are subjected to pressure to effect the desired separation or concentration. Therefore, the filter material must maintain its physical integrity and desired properties under pressure. Rotary filtration units are particularly difficult working environments for filters, in part because the filters may additionally be subjected to high centrifugal forces.

It is well known that polymers are useful raw materials for the production of filters. Typically, the polymers useful for the fabrication of rigid porous articles tend not to be dissolved by or swell in water and are commonly referred to as being hydrophobic, e.g., acrylonitrile polymers or copolymers. Unfortunately, the polymeric qualities that give crystallinity and physical strength to filters of these materials cause adsorptive interactions during separation and concentration operations. As a consequence, the filters become fouled by materials in the feed. As explained above, fouling is a major problem because the formation of a fouling layer upon the filter's surface interferes with its operation, thereby necessitating cleaning.

Polymeric compositions that tend not to exhibit adsorptive interactions during separation also tend to lack the necessary physical strength for pressure-driven separations. Those compositions are pressure-sensitive and can readily be compressed and distorted by applied pressure. Agarose and polyacrylamide are examples of such compositions. Because throughout their structures they are hydrophilic and thus interact with water and swell, they form hydrated gels.

Attempts have been made to overcome the disadvantages of hydrophobic-type polymeric compositions by chemically modifying the surface of porous articles formed from those compositions. Linder U.S. Pat. Nos. 4,584,103 and 4,477,634 concern methods of increasing the pressure stability of a polyacrylonitrile-containing membrane by reacting it with hydroxylamine followed by additional steps, including reaction with a polyfunctional oligomer and a compound containing at least one ionic group. A disadvantage of this method, however, is that the resulting modified membranes contain charged groups, thereby making them unsuitable for some applications. Additionally, the methods suffer from defects such as the need for expensive reagents and poor control over the extent of modification.

Sano U.S. Pat. No. 4,265,959 concerns a method for the preparation of semipermeable membranes, which comprises sulfonating porous membranes of acrylonitrile polymers. In that method, a porous membrane is exposed to a gaseous sulfonating agent, e.g., sulfuric anhydride, under pressure. The resulting modified membrane is claimed to possess superior chemical, mechanical, and thermal properties due to crosslinking of its surface molecules and its increased hydrophilic character. However, the Sano method suffers from similar defects as described above (i.e., the need for expensive reagents and poor control over the extent of modification). In fact, the patent notes that if the whole membrane is sulfonated it becomes brittle.

Sano U.S. Pat. No. 4,147,745 concerns a surface-modifying method that comprises exposing a membrane of acrylonitrile-type polymers to a plasma. The resulting membrane is claimed to have a surface whose polymer molecules are cross-linked, thereby increasing its physical strength. Nakanishi U.S. Pat. No. 4,501,785 concerns a method of hydrophilizing a porous membrane made of a polyolefin (e.g., polyethylene) by coating the surfaces that define the pores with polyethylene glycol. These Sano and Nakanishi methods also involve expensive procedures. Furthermore, the Nakanishi method is limited to membranes whose pores can accommodate the polyethylene glycol molecule.

There is a continuing need for rotary filtration devices that are more effective and efficient (for example, have a reduced tendency to become clogged). There is also a need for rotary filtration devices having strong and durable filters that inherently have a reduced tendency to become blinded or to clog.

SUMMARY OF THE INVENTION

Applicants have already disclosed a material having superior properties suitable for use as filters (among other things) in U.S. Pat. Application Ser. No. 149,552, filed Jan. 28, 1988, of which this application is a continuation-in-part. (See also Dean, Jr., and Nerem (editors), *Bioorocess Enoineerino Colloouium* (American Society of Mechanical Engineers, New York), pages 93-96: Hildebrandt and Saxton, "The Use of Taylor Vortices in Protein Processing To Enhance Membrane Filtration Performance" (1987).) Applicants have discovered that the use of such filters in a rotary filtration device is of particular value, making the device more effective and efficient.

In one aspect, the present invention provides a rotary filtration device comprising:
(a) an outer member having an inner surface;
(b) an inner member having an outer surface and mounted at least partially within the outer member to define a fluid gap between the inner surface of the outer member and the outer surface of the inner member;
(c) means for rotating the outer member or the inner member or both; and
(d) filter means for filtering fluid in the fluid gap, the filter means being located on the inner surface of the outer member or on the outer surface of the inner member or on both and comprising molecules of a suitable polymer that provides solely on the surface of the filter means sufficient uncharged substituted amide groups to render the surface hydrophilic.

Preparation of those filters involves a chemical reaction between nitrile groups of a hydrophobic-type polymer and an aldehyde to produce hydrophilic amide groups only on the surface of the filter. The fundamental chemistry of this reaction is well-known (see, e.g., Magat, J. Am. Chem. Soc.. volume 73, pages 1028-1037 (1951); Mowry U.S. Pat. No. 2,534,204). Mowry British Patent No. 677,516 describes a method utilizing this chemical reaction for the synthesis of nylon-type polymers. However, the Mowry method produces polymers having the resulting amide groups as part of the polymer backbone and, therefore, articles formed from these polymers have the amide groups throughout their structures. In contrast, the process of Ser. No. 149,552, filed Jan. 28, 1988, reacts the nitrile groups pendent to the polymer backbone in preformed matrices. The reaction rate may be controlled so that only the surface of the filter contains amide groups, thereby providing fouling resistance to the surface while maintaining the physical strength of the filter.

In another embodiment the present invention provides a rotary filtration device comprising:
(a) an outer member having an inner surface;
(b) an inner member having an outer surface and mounted at least partially within the outer member to define a fluid gap between the inner surface of the outer member and the outer surface of the inner member;
(c) means for rotating the outer member or the inner member or both; and
(d) filter means for filtering fluid in the fluid gap, the filter means being located on the inner surface of the outer member or on the outer surface of the inner member or on both and comprising molecules of a suitable polymer that provides solely on the surface of the filter sufficient uncharged hydrophilic polar groups to render the surface hydrophilic, the polar groups having been obtained by derivatization of reactive pendent groups of the polymer.

In another embodiment the polymer is a nitrile-containing Polymer and the substituted amide groups are derived from the nitrile groups. The polymer may be of acrylonitrile or methacrylonitrile and the substituted amide groups may be N-methylolamide groups. Ligands (for example, bio-selective affinity groups) may be attached either directly or through intermediate linking groups to the filter. The filter polymer may be crosslinked.

As used herein "filter means" includes one or more filters. The word "filter" includes any filter, membrane, sieve, separation article, rod, fiber bundles, sheet, and the like that can be utilized for "filtering" in a rotary filtration device. A "filter" may move (e.g., rotate) or be stationary in the device. One, two, or more filters may be used. For example, the rotary filtration device may have three concentric cylindrical members, with filters mounted on each, and one, two, or three of the members may rotate. "Filtering" and "filtration" each include the processes of filtration, ultrafiltration, microfiltration, reverse osmosis, dialysis, pervaporation, water-splitting, sieving, affinity chromatography, affinity purification, affinity separation, affinity adsorption, and the like. The design of the rotary filtration apparatus of this invention is not critical; the device need only have at least two members, at least one of which rotates, means for effecting the rotation, and at least one filter on one of the members and having solely on its surface sufficient uncharged groups to render the surface sufficiently hydrophilic.

The devices of this invention have significant advantages over previous filtration devices. The combination of rotation and the hydrophilic membrane yields a device that is significantly more effective and efficient in part because of the reduced tendency of the device to become blinded or clogged. Furthermore, it is believed that with the combination, the rejection of, for example, proteins in a fluid being filtered can be adjusted to an extent not known before by, for example, controlling the speed of rotation. It is believed that other advantageous and unexpected phenomena flow from the combination.

BRIEF DESCRIPTION OF THE DRAWINGS

To facilitate further description of the rotary filtration device of this invention, the following drawings are provided in which.

These drawings are for illustrative purposes only and should not be construed to limit the scope of the invention.

DETAILED DESCRIPTION OF THE INVENTION

The design of the rotary filtration device of this invention is not critical and any design may be used so long as the device has at least two members (at least one of which rotates) to define a filtration gap, means for effecting the rotation, and at least one filter facing the filtration gap and having solely on its surface sufficient uncharged groups to render the surface hydrophilic. The uncharged groups on the filter are uncharged hydrophilic polar groups, preferably obtained by derivatization of reactive pendent groups of the polymer of the filter. Preferably the polar groups are substituted amide groups and the reactive pendent groups are nitrile groups. If the filter is a sheet, desirably at least one major planar surface of the filter has sufficient uncharged groups and that planar surface faces the fluid in the gap.

Desirably Taylor vortices are employed in the fluid in the fluid gap to help reduce blinding of the filter surface and maintain filtration efficiency. The instabilities in fluid flow between concentric cylinders where only the inner cylinder is in motion were first investigated by Lord Rayleigh. Taylor found that when a certain Taylor's number was exceeded, axially circumferential vortices appear, which rotate in alternately opposite directions.

Figure 1:
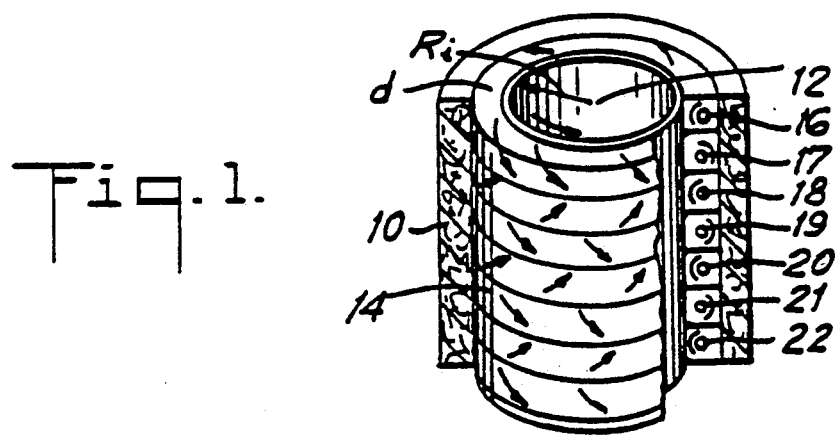
FIG. 1 is a schematic showing Taylor vortices in fluid within a fluid gap between two concentric cylindrical members of a rotary filtration device shown partially in section.

FIG. 1 shows this phenomenon in simplified form. Outer stationary cylinder 10 is separated from inner rotating cylinder 12 of radius $R_i$ by a gap of width d. The gap is filled with fluid 14. Under the proper conditions, set forth below, vortices rotating clockwise (16, 18, 20, 22) and counter-clockwise (17, 19, 21) exist.

Taylor determined that the minimum condition for the establishment of such vortices, defined as the Taylor number $(T_a)$, was $$T_a = \frac{\mu_i d}{\nu} \sqrt{\frac{d}{R_i}} \geq 41.3$$

where $\nu$ is the kinematic viscosity of the fluid and $\mu_i$ is the peripheral velocity of inner cylinder 12. Taylor and others determined that the vortices would persist in some cases at $T_a = 400$ and in other cases up to $T_a = 1700$, but that turbulence would ensue if the Reynolds number $(R_a)$ rose above about 1000.

$$R_a = \frac{\omega(2d)}{\nu},$$

where $\omega$ is axial velocity.

Figure 2:
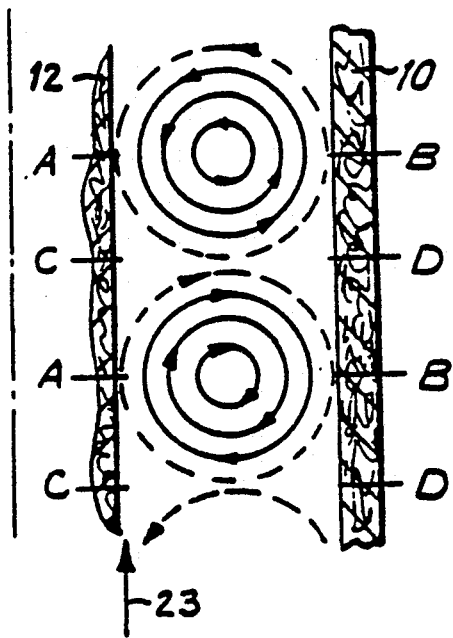
FIG. 2 is an enlarged view of a portion of FIG. 1.

In FIG. 2, points A and B denote positions on the respective inner and outer walls opposite the center of a vortex, and points C and D denote positions between a pair of vortices. The shear stresses due to tangential velocity, $v_z$, at one point A are in one direction and at the next point A are in the opposite direction. In a rotary filtration device, inner wall 12 or outer wall 10 or both may be a filter. When there is a net axial velocity due to the feeding of parent fluid (arrow 23) and removal of permeate and concentrate in a filtration device, the individual vortices assume what appears to be a helical shape (rather than planar circular) and move from the inlet to the outlet. Whether the vortices are helical or planar circular, the surface of the filter is continuously scoured by the solution itself, and particulates, gels, and colloids that would otherwise collect thereon are maintained in the solution.

Figure 3:
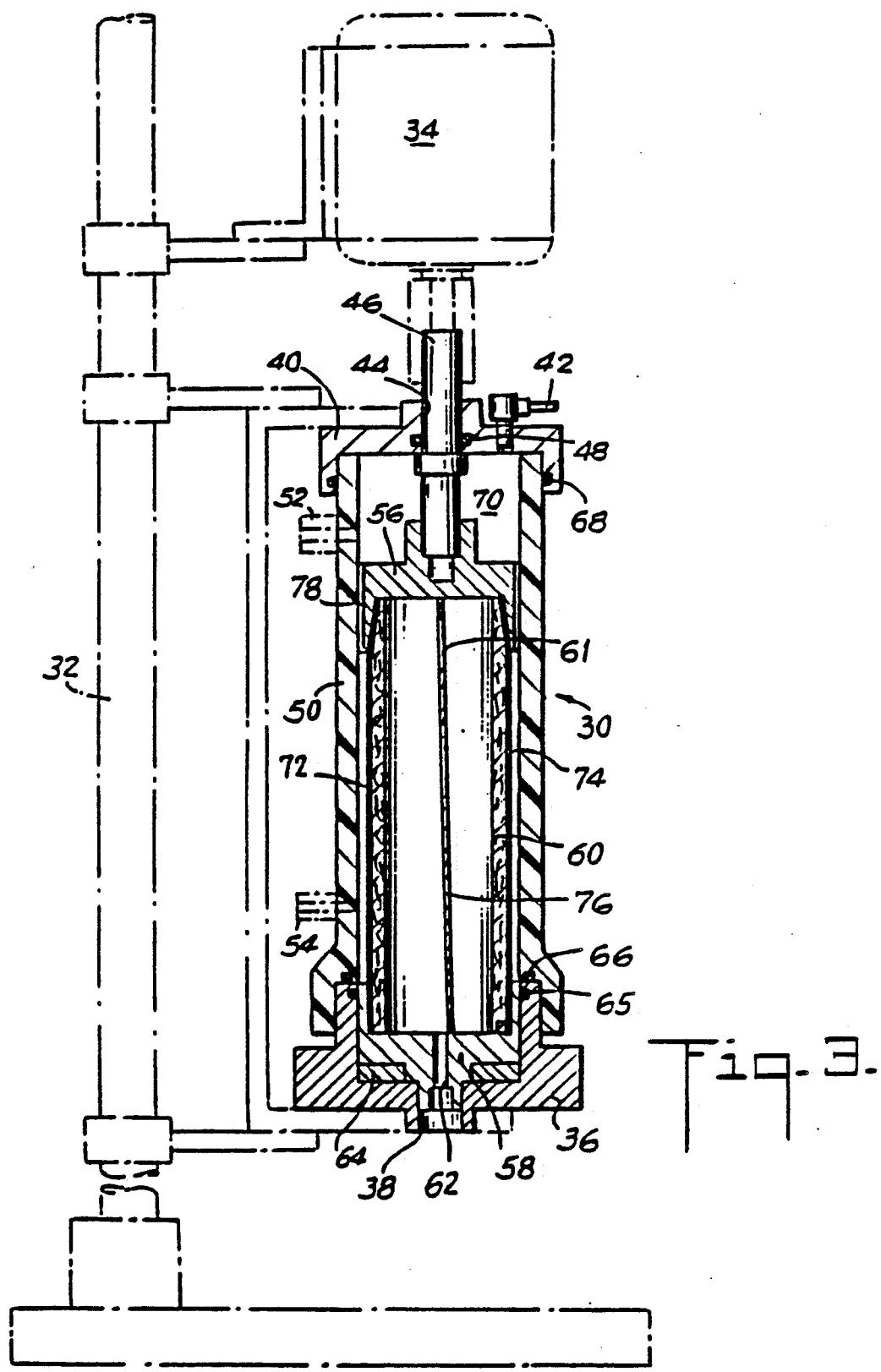
FIG. 3 is a side elevational view of a rotary filtration device of this invention shown partially in section.

One embodiment of the present invention is shown in FIG. 3. Apparatus 30 is supported on rack 32 to which is also attached drive motor 34. The stationary portions of apparatus 30 comprise an outlet (lower) housing 36 with outlet 38 centered in the bottom thereof, inlet (upper) housing 40, including gas line fitting 42, central opening 44 to accommodate drive shaft 46, and gasket (seal) 48. Housings 36 and 40 hold between them outer (stationary) cylinder 50, which may be made of any suitable material, e.g., plastic. There may be several interchangeable cylinders 50, all having the same outside diameter but each having a different inside diameter, whereby gap width d may also be varied. Cylinder 50 may be provided with inlet 52 and outlet 54 (shown in phantom) so that filtrations involving feed recirculation can be performed.

The rotating portions of apparatus 30 comprises drive shaft 46, upper housing 56, lower housing 58, and porous (rotating) inner cylinder 60 supported between housings 56 and 58. Cylinder 60 includes vertical slot 61 for accommodating the ends of filter membrane 74 wrapped therearound. Slot 61 can be opened slightly for insertion of filter ends 76 but normally will be sealed tightly. Housings 56 and 58 are sized to make a tight friction seal against the filter to prevent any leakage. Upper housing 56 has drive shaft 46 axially fitted into its top for rotation therewith. Lower housing 58 includes axial opening 62, which is the permeate outlet, and bushing 64 formed of a material selected for minimuim resistance (e.g., Teflon plastic). Gasket (seal) 65 is provided between (rotating) lower housing 58 and (stationary) housing 36. O-rings 66 and 68 are provided between outer cylinder 50 and housings 36 and 40, respectively, to prevent fluid leakage.

The outside diameter of upper housing 56 is less than the inside diameter of outer cylinder 50, thereby providing a fluid communication path 78 between chamber 70 at the top of the apparatus and fluid gap 72 between cylinders 50 and 60 for gas fed from gas line 42. Even if the fluid sample does not fill space 72, a large membrane area relative to the fluid in fluid gap 72 is presented and gas pressure from line 42 can pressurize the sample and aid filtration.

Figure 5:
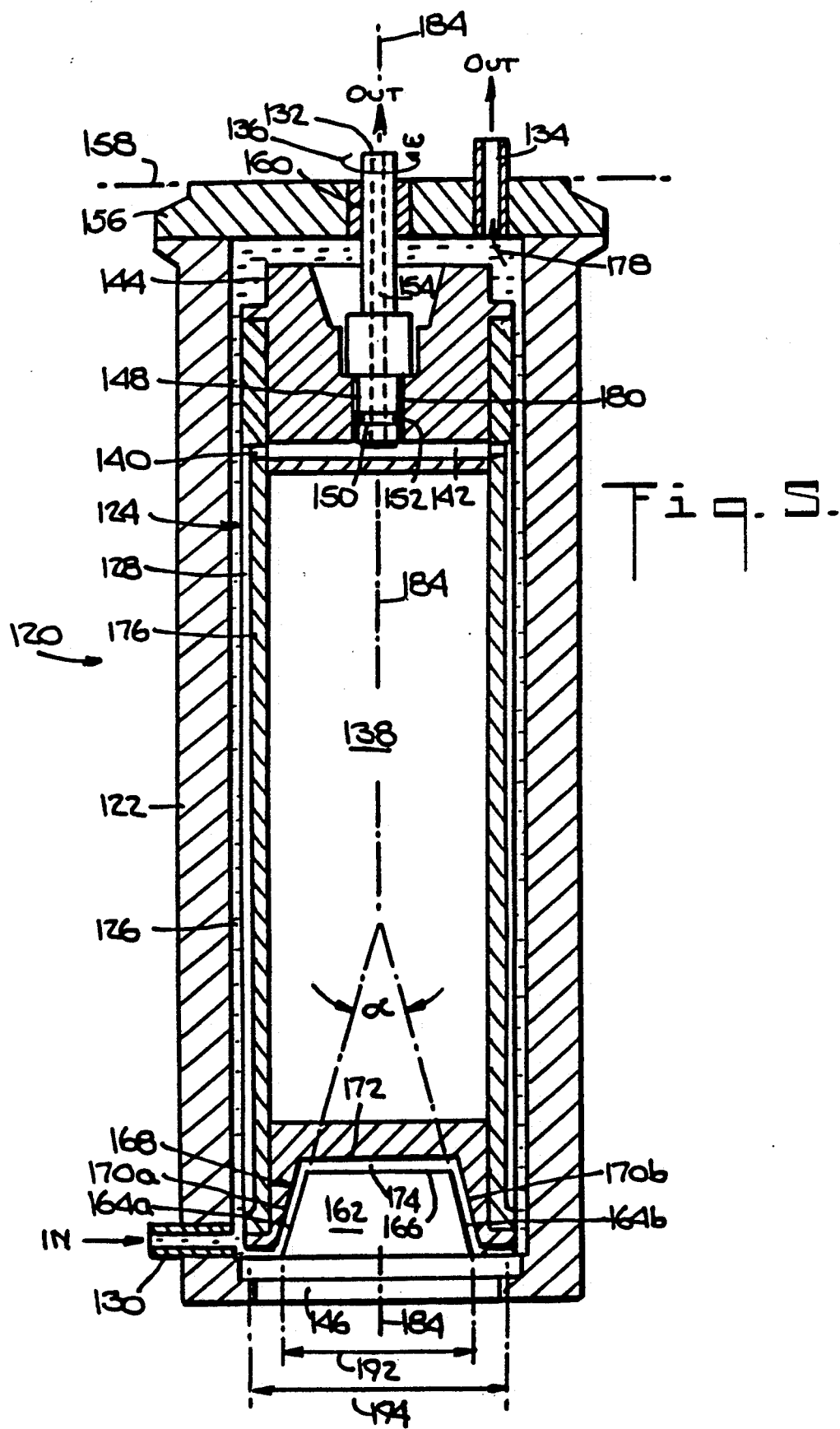
FIG. 5 is an elevational sectional view of a Preferred rotary filtration device of this invention.

The design of the rotary filtration unit used in this invention is not critical. Other possible designs are shown and described in Membrex's PCT Application Publication No. WO 85/02783, published July 4, 1985. Still other designs are known to those skilled in the art. A preferred design is shown in FIG. 5 and is described below.

As will be understood from reading this application, the key features of the device are at least two members, one mounted at least partially within the other to define a fluid gap therebetween, means for rotating either or both members, and filter means on at least one of the members and facing the fluid gap, the filter having sufficient uncharged polar groups (e.g., amide groups) to render the surface hydrophilic.

Two, three, or more members may be in the device and one, some, or all of them may have filters mounted thereon. If two or more filters are used, they may be of the same or different material. One, some, or all of the members may rotate. The rotation may be accompanied by an up-and-down motion. Members that do not rotate may move up and down (i.e., translate axially). The one or more members that rotate need not be the one or more members that carry the one or more filters. Rotation may be at a constant or varying speed and in a single direction or in alternating directions. If two or more members rotate, they may rotate in the same or different directions and at the same or different speeds.

The filters may be mounted on their respective members using the scheme of FIG. 3, or with adhesive, or by clamps or straps. Any method of mounting may be used provided it does not unduly hinder operation of the device. Preferably the method of mounting does not significantly reduce the active area of the filter.

Fluid may be introduced into the fluid gap continuously or in batches. Permeate may be removed continuously or in batches. Retentate may be removed continuously or in batches.

A series of channels may be present on the surface of a member carrying a filters. Permeate that passes through the filter will be collected in the channels and flow to a common collection point (e.g., the interior of a member) for collection and/or withdrawal.

Because three or more members may be used, there may be more than one fluid gap. Taylor vortices may be used in none, one, or more of the fluid gaps.

the filter used therein may comprise molecules of a suitable polymer that provides solely on its surface, sufficient uncharged substituted amide groups to render the surface hydrophilic. Suitable polymers may have as pendent groups substituted amide groups or groups that can be derivatized to substituted amide groups. The polymer may be a homopolymer or a copolymer. In copolymers only one monomer need contain as pendent groups the substituted amides or groups which can be derivatized to substituted amide groups. The other monomers may, but need not, contain these pendent groups.

If the pendent groups before derivatization are nitrile groups, suitable monomers that may be present with the nitrile-containing monomer in a copolymer are monomers capable of polymerizing with the nitrile-containing monomer. Examples of such monomers include styrene-type monomers, such as styrene, methylstyrene, ethylstyrene, nitrostyrene, chlorostyrene, bromostyrene, chloromethylstyrene; acrylic or methacrylic acid ester-type monomers; conjugated dienes; halogenated olefins; vinylether monomers and like monomers.

The polymerization may be performed using standard techniques in the art, such as suspension polymerization or emulsion polymerization in an aqueous system. The polymer may also be blended with other polymers that may or may not contain substituted amide groups or groups which can be derivatized to substituted amide groups. The polymer can also be grafted to another polymer. The matrix may comprise molecules of essentially any polymer containing the appropriate pendent groups. For example, suitable polymers include polymers containing acrylonitrile-type monomers, cyanostyrene monomers, pentenenitrile monomers, butenenitrile monomers, and cyanoethylester acrylic acid monomers. The preferred polymers contain acrylonitrile-type monomers, such as acrylonitrile, methacrylonitrile, chloroacrylonitrile, fluoroacrylonitrile, and cinnamnitrile, particularly acrylonitrile or methacrylonitrile.

Suitable substituted amide groups are groups which are hydrophilic, that is, show an affinity to water. These amide groups may be obtained by derivatization of the pendent groups of the polymer or they may be "prefabricated" and then deposited or grafted directly onto the polymer at the surface of the filter matrix. It is likewise possible to deposit nitrile or other pendent groups on the surface of the matrix and then derivatize all or a portion of the groups to the substituted amide groups to render the surface hydrophilic. Likewise, monomers containing the appropriate pendent groups or amide groups may be deposited or grafted onto the surface of the matrix.

The acyl portion of the amide groups may comprise an alkyl group or an aryl group, depending on the structure of the groups prior to derivatization. The amino portion of the amide groups may be mono- or di-substituted; some of the amide groups may be unsubstituted. In the preferred filter, the amide groups are predominately mono- and di-substituted groups. The substituted portion may comprise an alkyl group or an aryl group, of which alkyl groups are preferred, paticularly methylol groups. In the most preferred embodiments, the substituted amide groups are N-methylolamides.

The surface of a polymer matrix has voids formed by imperfections in the outer part of the matrix and micropores formed by the molecular structure of the matrix. The term "surface" is intended to include the polymers or portions thereof that define these voids and micropores.

Small amounts of substituted amide groups may be present in areas of the matrix other than the surface. However, only the surface of the filter will have sufficient substituted amide groups to render the surface hydrophilic. The other areas of the matrix will not contain sufficient amide groups to render those areas hydrophilic.

The substituted amide groups are uncharged at neutral or near-neutral pH's. It is possible to induce a charge on the substituted amide groups by changing their environment.

The polymer matrix may also comprise a plurality of ligands attached to a portion of the hydrophilic substituted amide groups or derivatives thereof. Suitable ligands include any ligand capable of attaching to the substituted amide groups of the matrix or to a derivative of the substituted amide groups. Preferred ligands comprise bio-selective affinity groups that selectively bind to biologically active substances and are typically used for the purification of biologically active substances. The inventory of useful affinity ligands is large and rapidly increasing. Most often, such ligands are derived from nature (i.e., biological-originating substances), while others are wholly or partially synthetic (i.e., biomimic substances). Many ligands can be referred to by traditional biochemical class names, for example, nucleotides, polynucleotides, nucleic acids (including DNA and RNA), carbohydrates, saccharides, polysaccharides, lipids, amino acids, peptides, and proteins. Others can be described as combinations of these substances, for example, lipopolysaccharides, lipo-proteins, and nucleo-proteins. Sub-class terms are often useful (e.g., enzymes and antibodies as sub-classes of proteins). Many other useful affinity ligands are better described by bio-function, such as steroids, hormones, vitamins, enzyme or metabolic co-factors, enzyme inhibitors, enzyme reactors, drugs, drug receptors, antibiotics, neurotransmittors, and antagonists. Still other ligands may be referred to as chromophores, dyes, ion-exchangers, amphiphiles, and the like.

The ligand attached to the filter may but need not be attached through a coupling molecule disposed between the substituted amide group or derivative thereof and the ligand. Numerous coupling molecules are well known and may be utilized in the present invention for attaching affinity ligands. Reagents for this purpose include cyanogen halides, triazinyl halides (e.g., trihalo-s-triazine and substituted halo-s-triazines), sulfonyl halides (e.g., alkyl and/or aryl sulfonyl-halides, including bis-sulfonyl halides), acyl halides (e.g., bis-acyl-halides), vinylsulfones, epoxides (e.g., bis-oxiranes), and the like.

Displacement reagents may also be used for coupling ligands. The reagents are reacted with the matrix surface groups and subsequently undergo displacement reaction with the affinity ligand. Such reagents include sulfonyl halides such as aryl-sulfonyl halides (e.g., tosyl-halides), alkyl sulfonyl halides (e.g., methane sulfonyl halide), halo-alkyl-sulfonyl halides (e.g., trifluoroethane sulfonyl halides), halopyrimidines (e.g., 2-fluoro-1-methylpyridinium toluene-4-sulfonate), and the like. Other preferred ligands and methods for attaching the ligands to the matrix of this invention will become apparent to those skilled in the art of affinity sorption and enzyme immobilization from the present application.

In some of the filters used herein, a portion of the molecules of the polymer matrix are crosslinked to other such molecules. Crosslinking imparts properties to the filter that in most applications are desirable, e.g., increased structural rigidity and increased resistance to organic solvents. Preferably the crosslinking is between substituted amide groups. In filters where the substituted amide groups are N-methylolamide groups, the crosslinking is thought to be by means of methylene-bis-amide. The most preferred filter is a porous article comprising a matrix wherein the polymer comprises acrylonitrile or methacrylonitrile, the hydrophilic substituted amide groups are N-methylolamide groups, and the molecules of the polymer are crosslinked to other such polymer molecules in the matrix.

The filter may be formed from a matrix comprising molecules of a suitable polymer having reactive pendent groups that provide essentially only on the surface of the filter sufficient uncharged hydrophilic polar groups to render the surface hydrophilic. The polar groups are obtained by derivatization of the pendent groups. Preferably, the reactive Pendent groups are nitrile groups and the polar groups are substituted amide groups.

Figure 4:
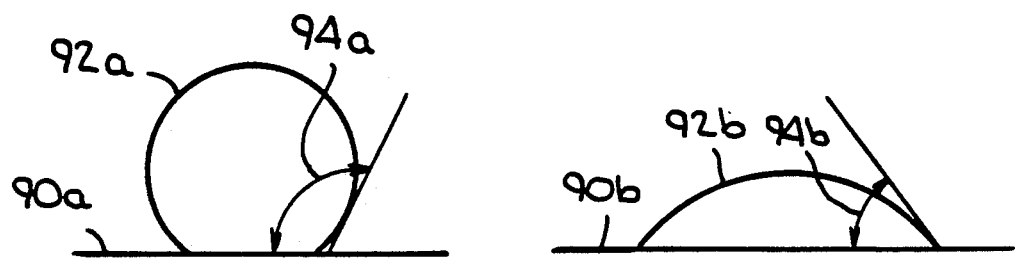
FIG. 4 is an enlarged view showing drops of water on hydrophobic and hydrophilic surfaces and the angle theta between the solid surface and the liquid surface in each case.

Hydrophilicity of a solid surface relates to the surface's affinity toward aqueous solutions. Hydrophilicity is an indication of a filter's biocompatability, i.e., its ability to be used effectively with proteins and similar substances without encountering significant fouling problems. Although hydrophilicity is not quantitatively defined in the industry, it can be qualitatively measured by the degree to which water spreads over the solid surface or by the angle theta of contact between the liquid surface and the solid surface when a drop of water rests on the solid surface (see FIG. 4). The more hydrophilic a surface is, the lower angle theta will be. FIG. 4 shows that drop of water 92a has a greater angle theta when the water is on relatively hydrophobic surface 90a than when water drop 92b is on relatively hydrophilic surface 90b, that is, angle theta 94a is greater than angle theta 94b.

The hydrophilicity of the filter used herein can be preselected during its manufacture by control of reaction rates, reagent concentration, catalyst concentration, etc. The hydrophilicity can range from nearly that of the untreated nitrile-containing polymer to "hyperhydrophilic" or "hyperphilic" (i.e., contact angles theta below about 15 degrees). Preferably, the hydrophilic surface of the filter has a contact angle less than about 30 degrees when measured in a pH between 2 and 12 and more preferably less than about 15 degrees. The most preferred filters used herein are hyperhydrophilic. Filters that are relatively more hydrophilic than the original untreated matrixes may be used in the devices of this invention, regardless of whether the filters would be considered hydrophilic or hydrophobic by one skilled in the art.

Suitable polymers for the filter include polymers that contain pendent groups which can be derivatized to substituted amide groups, e.g., nitrile-containing polymers. For making some filters used herein, derivatizing comprises contacting the molecules of the nitrile-containing polymer with an aldehyde or an aldehyde generating compound. Generally, any aldehyde may be used; however, the size of the aldehyde molecule may limit the usefulness of the aldehyde in embodiments where the filter is porous. In such cases, the size of the pores will determine the suitability of the aldehyde by imposing an upper limit on the aldehyde's molecular size. The most preferred aldehyde is formaldehyde and the most preferred aldehyde-generating compound is a formaldehyde-generating compound, particularly dimethoxymethane, trioxane, and paraformaldehyde.

The contact time for contacting the nitrile-containing polymer with the aldehyde or the aldehyde-generating compound should be long enough to permit the formation of sufficient substituted amide groups to make the filter's surface hydrophilic but not long enough to hydrophilize the entire filter structure. This operation may be carried out in the presence of a catalyst, which may comprise one or more acids, preferably a combination of a strong acid and a weak acid. Many strong acids are known to those skilled in the art and can be used. Common mineral acids (e.g., hydrochloric, phosphoric, and sulfuric) are preferred. Other preferred strong acids include alkylsulfuric, alkylsulfonic, halosulfuric, and the like, for example, trifluoromethane sulfonic acid and fluorosulfuric acid. Preferred weak acids include acetic acid. The acid may be generated by an acid-generating substance, e.g., boron trifluoride and aluminum chloride. Other suitable acids will be apparent to those skilled in the art.

The reaction rate may be varied by controlling catalyst strength. If the catalyst is an acid, catalyst strength means both the concentration and the inherent strength of the acid. The degree of hydrophilicity of the filter surface may be controlled by adjusting the relative concentrations of the strong acid, the weak acid, and of the aldehyde or aldehyde-generating compound.

Contact with the aldehyde or aldehyde-generating compound is preferably carried out by soaking the matrix in a reagent bath containing the aldehyde or the aldehyde-generating compound. The time of soaking, the temperature of the reagent bath, and the concentration of the reagents will depend on the type of aldehyde or aldehyde-generating compound used, the type of nitrile-containing polymer present, the quantity and strength of the catalyst (if present), and the filter properties desired.

To prevent polymerization of the aldehyde or repolymerization of the polymer, the water content of the reaction bath should be kept low. The precise level required will vary with the particular acid used, but the level in all cases should be such as to avoid competing reactions. In the embodiments where the nitrile-containing polymer comprises an acrylonitrile-type monomer, preferably the hydrophilic substituted amide groups are N-methylolamide groups, the contacting is effected with a formaldehyde-generating compound in the presence of an acid, the soaking bath reaction lasts between 1 minute and about 48 hours, and the temperature of the reagent bath is from about 1° C. to about 90°C. For preferred filters, in which portion of the molecules of the polymer on the surface of the matrix are crosslinked to other such molecules, the duration of the soaking bath reaction is from several minutes to about 24 hours and the temperature of the reagent bath is from about 10° C. to about 60°C.

Manufacture of filters useful herein and use of such filters in a rotary filtration device are described in the examples which follow. These examples are intended to aid in understanding the invention but are not intended to, and should not be construed to, limit in any way the invention as set forth in the claims which follow.

EXAMPLE 1

A porous thin flat sheet membrane composed of polyacrylonitrile polymers of greater than 90% acrylonitrile was treated for 4 hours in a bath containing 34.2 parts of concentrated sulfuric acid, 13.1 parts of concentrated acetic acid, 37.8 parts of formic acid, and 14.9 parts of trioxane as the formaldehyde source. The freshly composed reagent bath was allowed to equilibrate at 30° C. for 1 hour before use. Following the bath treatment, the membrane was soaked in a water bath at 2° C. for 30 minutes. The membrane was then soaked for 60 minutes at ambient temperatures in an aqueous bath consisting of 3.8 parts sodium borate, pH = 9.

Drops of water applied to the surface of the treated membrane readily spread. In similar drop tests with an untreated membrane, the water beaded and did not spread. The treated membrane was mounted in a conventional stirred cell apparatus and tested for fluid flux, protein rejection, and, after exposure to protein, for recovery of fluid flux. The test results show that in contrast with the untreated membrane, the treated membrane resisted fouling by protein and it recovered fluid flux after a simple flushing operation (see Table 1). This membrane was suitable for use in a rotary filtration device.

TABLE 1

| Protein | Buffer Flux* (liters/hour-square meter) | |
|---|---|---|
|  | Untreated Membrane | Treated Menbrane |
| none | 149 +/−7 | 178 +/−9 |
| myoglobin | 65 | 184 |
| ovalbumin | 52 | 184 |
| bovine serum albumin | 53 | 179 |
| bovine gamma-globulins | 24 | 175 |

*10 psi transmembrane pressure difference

EXAMPLE 2

A membrane was treated for 3 hours in a reagent bath at 30°C. The article was composed of greater than 90% acrylonitrile monomers. The reagent bath contained 15.0 parts of trioxane, 13.2 parts of acetic acid, 37.4 parts of formic acid, and 34.4 parts of concentrated sulfuric acid. After treatment, the membrane was rinsed with water and soaked at ambient temperature for 60 minutes in an aqueous bath consisting of 3.8 parts sodium borate, pH = 9.

After rinsing with water and blotting dry, the membrane could be wetted by water, which readily spread upon the hydrophilic surface. Hydrophilicity of the membrane was also indicated by the solid-liquid contact angle theta made by application of a drop of an aqueous solution applied to the membrane surface according to the method of Whitesides et al., Lanomuir, volume 1, pages 725–740 (1985). The contact angle measured 30 seconds after drop application was 4 degrees for the treated membrane and 46 degrees for the untreated membrane. For comparison, the contact angles were also measured for conventional commercially available membranes made of other materials. It became obvious from these results that the membrane is markedly more hydrophilic ("hyperphilic") than well-known so-called hydrophilic membranes. Comparative results are shown in Table 2.

TABLE 2

| Membrane | Contact Angle (degrees)* |
|---|---|
| hyperphilic filter (treated) | 4 |
| untreated filter | 46 |
| conventional polyethersulfone | 65 |

TABLE 2-continued

| Membrane | Contact Angle (degrees)* |
| --- | --- |
| "hydrophilized" polyethersulfone | 44 |
| "hydrophilic" cellulosic | 24 |

*contact angle measured at 30 seconds after drop application to surface

The hydrophilicity of the treated membrane was also examined by measurements of fluid flux in a conventional stirred cell apparatus before and after exposure to protein. It became evident from the test results that the treated membrane resisted fouling by protein and recovered fluid flux after a simple flushing operation (Table 3). The treated membrane was suitable for use as a filter in a rotary filtration device.

TABLE 3

| Sample | Buffer Flux After Sample Filtration* (liters/hour-square meter) |
| --- | --- |
| buffer | 596 |
| bovine serum albumin | 630 |
| bovine gamma-globulins | 589 |

*10 psi transmembrane pressure difference

EXAMPLE 3

A membrane composed of polyacrylonitrile-containing polymers was treated for 60 minutes at 23° C. in a bath containing 25 parts dimethoxymethane and 75 parts sulfuric acid. The bath was equilibrated at 23° C. for 1 hour before use. Following this bath, the membrane was soaked in a water bath at 2° C. for 30 minutes and then in an aqueous bath containing 3.8 parts of sodium borate, pH =9, at ambient temperature for 60 minutes.

As in the preceding examples, drops of water applied to the surface of the treated membrane spread readily. Similarly, when the membrane was examined in a stirred cell for recovery of fluid flux after exposure to protein, it became evident that the treated membrane resisted fouling by protein and recovered fluid flux after a simple flushing operation. For example, the treated membrane exhibited an initial buffer flux of 44.7 liters per hour-square meter at 20 psi transmembrane pressure before exposure to protein. After ultrafiltration of individual protein solutions of myoglobin, chymotrypsin, ovalbumin, and bovine serum albumin, the initial buffer flux was recovered for each protein.

EXAMPLE 4

A membrane composed of polyacrylonitrile-containing polymers was treated for 1 hour at 23° C. in a reaction bath containing 21.9 parts dimethoxymethane, 65.3 parts of concentrated sulfuric acid, and 12.8 parts of acetic acid. The treated membrane was then soaked in a cold water bath and a borate bath as described in Example 3.

Drops of water spread readily when applied to the surface of the treated membrane. When the membrane was examined in a stirred cell for recovery of fluid flux after exposure to protein, it was observed that the treated membrane resisted fouling by protein and recovered fluid flux after a simple flushing operation. This membrane filter was suitable for use in a rotary filtration device.

In other studies, the treated membrane was found to resist disruption and dissolution by organic solvents that rapidly and completely dissolved untreated membranes. For example, after a treated membrane and an untreated membrane had been soaked in a solvent bath of gamma-butyrolactone at ambient temperature for one hour, the untreated membrane had dissolved while the treated membrane was still intact. A treated membrane exposed for 4 days to gamma-butyrolactone in a solvent bath at ambient temperature showed no significant difference from treated membrane that had not been exposed to solvent (see Table 4).

TABLE 4

| | Buffer Flux After Sample Filtration* (liters/hour-square meter) | |
| --- | --- | --- |
| Sample | Before Solvent | After Solvent** |
| buffer | 41 | 44 |
| myoglobin | 44 | 46 |
| ovalbumin | 44 | 46 |
| bovine serum albumin | 44 | 46 |
| bovine gamma-globulin | 41 | 41 |

*10 psi transmembrane pressure difference
**solvent bath 100% gamma-butyrolactone at ambient temperature; membrane solvent exposure time 4 days

EXAMPLE 5

A membrane composed of polyacrylonitrile-containing polymers was treated for 6 hours at 23° C. in a formaldehyde reaction bath containing 5.8 parts of paraformaldehyde, 44.2 parts of concentrated sulfuric acid, and 50 parts of concentrated acetic acid. The treated membrane was soaked in a water bath at 2° C. for 30 minutes and then for 60 minutes at 23° C. in an aqueous bath containing 3.8 parts of sodium borate, pH =9. The treated article had hydrophilic character, as shown by the degree to which water spread. In studies similar to those described above, the treated membrane recovered its initial buffer flux after ultrafiltration of protein solutions. The treated membrane filter was suitable for use in a rotary filtration device.

EXAMPLE 6

A membrane was treated as in Example 2 and then exposed to an aqueous solution consisting of approximately 0.01M sodium carbonate, 0.3M sodium chloride, and 2 milligrams per ml of "reactive dye." The reactive dye was Procion Red Reactive Dye MX-2B (PolySciences), which is a red colored, chromophore-substituted, triazinyl-halide that reacts like an acyl-halide with suitable nucleophiles, among which are N-methylolamides. The reaction between the reactive dye and the treated membrane was conducted overnight (16 hours) at ambient temperatures. The reacted membrane was washed extensively with water and saline solution to remove unreacted dye.

The resulting membrane was found to be permanently derivatized to show a red color that could not be removed by further washings. In this example, the red chromophore is considered as a potential affinity-sorptive ligand and the reactive triazinyl moiety represents a well-established reagent for linking affinity ligands in general to suitable matrix materials (e.g., Hodgins, L.T., and Levy, M., "Affinity Adsorbent Preparation: Chemical Features of Agarose Derivatization with Trichloro-s-triazine," *J. Chromatography*, volume 202, page 381 (1980)).

EXAMPLE 7

A commercially available polyacrylonitrile homopolymer (presumably about 99% acrylonitrile) was dissolved and cast on a standard polypropylene nonwoven fabric using conventional casting techniques to make a porous membrane having a 100,000-molecular weight cut-off. That membrane was treated using the procedure and materials of Example 2 to produce a filter that was mounted in a rotary filtration device essentially the same as that shown in FIG. 5. (The FIG. 5 device is described in detail in Membrex U.S. Application Ser. No. 204,621, filed June 9, 1988, which application is incorporated by reference herein in its entirety.)

In FIG. 5 device 120 comprises cartridge 124 rotating inside housing 122 having longitudinal axis 184. The direction of rotation is indicated by arrow 136 and rotational velocity is indicated by omega. Feed liquid enters the device through fluid inlet 130 and flows into the space between the cartridge and the housing, which space includes fluid gap 126. Some of the fluid in the gap flows through filtration membrane 128, through collection grooves (not shown) on the outer surface of cartridge side wall 176, through ports 140 in side wall 176 into plenum 142, and through longitudinal passageway 154 in drive shaft 132 out of the device. Retentate leaves the void space between the housing and the rotating cartridge through outlet nozzle 134 as shown by arrow 178. Internal cavity 138 is closed and does not contain fluid.

Cartridge 124 has top plug 144 and housing 122 has bottom plug 146, the top part of which is convexity 162. That convexity has a frusto-conical shape with side surface 164 and top surface 166. Because FIG. 5 is a longitudinal cross-section of the device with longitudinal housing axis 184 lying in the plane of the cross-section, frusto-conical convexity 162 appears as a trapezoid. The opposing slanted (angled) sides 164a and 164b of that trapezoid form an angle alpha of about 30 degrees.

Cartridge 124 has matching frusto-conical concavity 168, which has top side 172 and side wall 170. In the cross-section of FIG. 5, the three-dimensional curved side wall 170 has straight side walls 170a and 170b.

The cartridge is rotated by drive means (not shown) located above section line 158 in top 156 of the housing. Rotational force is transmitted by means of drive shaft 132, which passes through bearing/seal 160, and drive shaft extension 148. Drive shaft extension 148 is friction-fit inside matching concavity 180 in top plug 144 of the cartridge. O-ring 152, which fits within circular groove 150 in extension 148, provides a fluid-tight seal between filtrate in plenum 142 and retentate in the void space. As result of rotation and of the bearing surface 170 in the bottom of the cartridge being slanted, a vertical upwards force against surface 170 also develops and pushes the cartridge up, thereby insuring a fluid-tight seal. Cartridge 124 has outer diameter 194 and cartridge concavity 168 has outer diameter 192.

The outer member of the rotary filtration device employed had an inner diameter of 3.6 cm, the outer diameter of the inner member was 3.2 cm, and the gap width was 0.2 cm. The effective membrane filtration area was 63.6 $cm^2$. The membrane was mounted on the inner member, which was of polypropylene, by heat-sealing the polypropylene backing thereto.

An aqueous buffered (pH 7) 0.05 weight percent solution of ferritin (a protein of 440,000 Daltons molecular weight) was filtered with this device in the following manner. Fresh solution was combined with recycled retentate and the total stream fed to the liquid inlet, and permeate and retentate (for recycle) were continuously withdrawn. The transmembrane pressure was 10 psi, the inner member was rotated at 2000 rpm, and the outer housing member was stationary.

Filtration continued until the ferritin concentration in the retentate reached about 0.10 weight percent. The overall protein rejection was 99.3% and the average permeate flux was 226 liters/$m^2$-hour, which remained essentially constant.

Variations and modifications will be apparent to those skilled in the art and the claims are intended to cover all variations and modifications that fall within the true spirit and scope of the invention.

We claim:

1. A rotary filtration device comprising:
   (a) an outer member having an inner surface;
   (b) an inner member having an outer surface and mounted at least partially within the outer member to define a fluid gap between the inner surface of the outer member and the outer surface of the inner member;
   (c) means for rotating the outer member or the inner member or both; and
   (d) filter means for filtering fluid in the fluid gap, the filter means being located on the inner surface of the outer member or on the outer surface of the inner member or on both and comprising molecules of a suitable polymer that provides solely on the surface of the filter sufficient uncharged substituted amide groups to render the surface hydrophilic.

2. The device of claim 1 wherein the polymer is a homopolymer.

3. The device of claim 1 wherein the polymer is a copolymer.

4. The device of claim 3 wherein the uncharged substituted amide groups are attached to less than all the monomeric units of the copolymer.

5. The device of claim 1 wherein the polymer is blended with other polymers.

6. The device of claim 1 wherein the polymer is grafted to another polymer.

7. The device of claim 1 wherein the hydrophilic surface has a contact angle of less than about 30 degrees when measured at a pH between 2 and 12.

8. The device of claim 7 wherein the hydrophilic surface has a contact angle less than about 15 degrees.

9. The device of claim 1 wherein the polymer is a nitrile-containing polymer.

10. The device of claim 9 wherein the substituted amide groups are derived from nitrile groups of the nitrile-containing polymer.

11. The device of claim 1 wherein the substituted amide groups are grafted to the polymer or attached to monomers that are grafted to the polymer.

12. The device of claim 9 wherein the polymer comprises an acrylonitrile-type monomer.

13. The device of claim 12 wherein the acrylonitrile-type monomer is acrylonitrile or methacrylonitrile.

14. The device of claim 13 wherein the substituted amide groups comprise N-methylolamide groups.

15. The device of claim 14 wherein the N-methylolamide groups are derived from nitrile groups of the nitrile-containing polymer.

16. The device of claim 14 wherein the N-methylolamide groups are grafted to the polymer or attached to monomers that are grafted to the polymer.

17. The device of claim 1 further comprising a plurality of ligands attached to at least some of the substituted amide groups.

18. The device of claim 17 wherein at least some of the ligands comprise bio-selective affinity groups.

19. The device of claim 18 wherein the bio-selective affinity group comprises a nucleic acid, polynucleotide, monosaccharide, polysaccharide, lipid, amino acid, peptide, protein, hormone, vitamin, metabolic co-factor, drug, antibiotic, or a combination thereof.

20. The device of claim 18 wherein the ligands have coupling molecules disposed between the substituted amide groups and the bio-selective affinity groups.

21. The device of claim 1 wherein molecules of the polymer are crosslinked to other such molecules.

22. The device of claim 21 wherein the substituted amide groups are N-methylolamide groups and the crosslinking is by means of a methylene-bis-amide.

23. A rotary filtration device comprising:
(a) an outer member having an inner surface;
(b) an inner member having an outer surface and mounted at least partially within the outer member to define a fluid gap between the inner surface of the outer member and the outer surface of the inner member;
(c) means for rotating the outer member or the inner member or both; and
(d) filter means for filtering fluid in the fluid gap, the filter means being located on the inner surface of the outer member or on the outer surface of the inner member or on both and comprising molecules of a suitable polymer that provides solely on the surface of the filter sufficient uncharged hydrophilic polar groups to render the surface hydrophilic, the polar groups having been obtained by derivatization of reactive pendent groups of the polymer.

24. The device of claim 23 wherein the reactive pendent groups are nitrile groups.

25. The device of claim 24 wherein the polar groups are substituted amide groups.

26. The device of claim 25 wherein the polymer comprises an acrylonitrile-type monomer and the substituted amide groups comprise N-methylolamide groups.

27. The device of claim 26 further comprising a plurality of ligands attached to at least some of the N-methylolamide groups.

28. The device of claim 27 wherein at least some of the ligands comprise bio-selective affinity groups.

29. The device of claim 26 wherein the molecules of the polymer are crosslinked to other such molecules by means of methylene-bis-amide.

* * * * *